United States Patent [19]

Arpin

[11] Patent Number: 4,530,954

[45] Date of Patent: Jul. 23, 1985

[54] WATER-BASED LIME DISPERSION PAINT

[75] Inventor: René Arpin, Lyons, France

[73] Assignee: Rhone-Poulenc Specialties Chimiques, Courbevoie, France

[21] Appl. No.: 571,710

[22] Filed: Jan. 18, 1984

[30] Foreign Application Priority Data

Jan. 28, 1983 [FR] France ............................ 83 01304

[51] Int. Cl.$^3$ .............................................. C08K 5/05
[52] U.S. Cl. .................................... 524/387; 524/431; 524/424; 524/425; 524/436; 524/556; 524/560; 524/565; 524/566; 524/570
[58] Field of Search ............... 524/387, 431, 424, 425, 524/436, 560, 565, 566, 570

[56] References Cited

U.S. PATENT DOCUMENTS

| | | | |
|---|---|---|---|
| 2,111,622 | 10/1936 | Goepp | 524/387 |
| 2,459,746 | 1/1949 | Radcliffe | 524/387 |
| 3,247,006 | 4/1966 | Hoge et al. | 524/425 |
| 3,942,995 | 3/1976 | Ichikawa et al. | 524/78 |
| 3,947,397 | 3/1976 | Schuster et al. | 260/29.6 M |
| 4,125,504 | 11/1978 | Mani et al. | 524/522 |
| 4,249,953 | 2/1981 | Keifer et al. | 524/425 |
| 4,267,092 | 5/1981 | Glaser et al. | 524/425 |
| 4,361,659 | 11/1982 | Friedemann et al. | 524/425 |

FOREIGN PATENT DOCUMENTS 1237164 6/1971 Japan .................................. 524/425

OTHER PUBLICATIONS

90 Chemical Abstracts 56419U (1979).
77 Chemical Abstracts 24278n (1972).

*Primary Examiner*—Paul R. Michl
*Assistant Examiner*—J. M. Reddick
*Attorney, Agent, or Firm*—Finnegan, Henderson, Farabow, Garrett and Dunner

[57] ABSTRACT

The present invention provides a water-based lime dispersion paint comprising a binder; a pulverulent, and one or more adjuvants. The binder comprises a film-forming copolymer of an alkyl acrylate monomer and a nonionic ethylenic monomer. The copolymer is dispersed in an aqueous medium and the dispersion is stable at a basic pH. The nonionic ethylenic monomer is capable of forming a homopolymer having a glass transition temperature in the range of 70° C. to 170° C. The pulverulent material comprises one or more pigments and airy slaked lime having a low hydraulicity index. The adjuvants are stable at a basic pH and include D-sorbitol as a stabilizer.

13 Claims, No Drawings

WATER-BASED LIME DISPERSION PAINT

FIELD OF THE INVENTION

The present invention relates to a water-based lime dispersion paint and to a process for its preparation. More particularly, the present invention relates to a water-based lime dispersion paint comprising a binder, a pulverulent, and one or more adjuvants.

SUMMARY OF THE INVENTION

Water-based paints containing lime are not commercially available, because of the very poor storage stability of aqueous mixtures containing lime.

It is therefore an object of the present invention to provide a water-based lime paint that is stable during storage and on exposure to ultraviolet rays.

It is also an object of the present invention to provide a water-based lime paint that has good film-forming characteristics.

To achieve these and other objectives, the present invention provides a water-based lime dispersion paint comprising a binder, a pulverulent, and one or more adjuvants. The binder comprises a film-forming copolymer of an alkyl acrylate monomer and a nonionic ethylenic monomer. The copolymer is dispersed in an aqueous medium and the dispersion is stable at a basic pH. The nonionic ethylenic monomer is capable of forming a homopolymer, having a glass transition temperature in the range of 70° C. to 170° C. The pulverulent material comprises one or more pigments and airy slaked lime having a low hydraulicity index. The adjuvants are stable at a basic pH and include D-sorbitol as a stabilizer.

DESCRIPTION OF THE PREFERRED EMBODIMENT

The present invention provides a water-based lime dispersion paint comprising a binder, a pulverulent, and one or more adjuvants. The binder comprises a film-forming copolymer of an alkyl acrylate monomer and a nonionic ethylenic monomer. The copolymer is dispersed in an aqueous medium, and the dispersion is stable at a basic pH. The nonionic ethylenic monomer is capable of forming a homopolymer having a glass transition temperature in the range of 70° C. to 170° C. The pulverulent material comprises one or more pigments and airy slaked lime having a low hydraulicity index. The adjuvants are stable at a basic pH and include D-sorbitol as a stabilizer.

In the present invention, the term "dispersion paint" is understood to be both a dispersion having a fluid consistency and a dispersion having a pasty or semi-fluid consistency, such as a coating.

As used herein, the term "pulverulent material" is defined according to standard specification AFNOR T 30-001, as "solid substances, insoluble in the suspension medium, which are finely divided and dispersed in this medium after wetting." In the present invention, the pulverulent materials comprise one or more pigments and lime, when the dispersion paint is a fluid dispersion. The pulverulent materials additionally include a filler, such as a carbonate, when the dispersion paint is a semi-fluid or pasty dispersion.

As used herein, the term "adjuvants" is defined according to standard specification AFNOR T 30-001 as "substances optionally incorporated at a low dose into binders, varnishes, paint, and, where appropriate, rough-cast coatings, so as to produce therein certain properties appropriate for improving either the conditions of manufacture and/or storage and/or application, or certain specific properties, of the said compositions."

In the present invention, the adjuvants can be, among other things, dispersants, thickeners, stabilizere, antifoam agents, antifreeze agents, coalescence agents, fungicides, and combinations thereof.

The film-forming copolymer, present in the composition of the binder, is produced from an alkyl acrylate monomer and a nonionic ethylenic monomer.

The nonionic ethylenic monomer can be selected from the group consisting of vinylaromatic monomers, such as styrene, methylstyrene, and vinyltoluenes; alkyl methacrylate monomers, such as methyl methacrylate; and acrylonitrile monomers.

Preferably, the alkyl acrylate monomers, which are employed in the invention, are capable of forming a homopolymer having a glass transition temperature in the range of $+10°$ C. to $-60°$ C. In one embodiment, the alkyl acrylate monomer has an alkyl group containing from 1 to 8 carbon atoms and, preferably, from 1 to 4 carbon atoms.

The amounts of the nonionic ethylenic monomer and the alkylacrylate monomer in the binder are chosen to provide the resulting copolymer with a glass transition temperature of between $-5°$ C. and $+25°$ C.

The amounts of the monomers to be used depend on the nature of the comonomers and on the glass transition temperature of the desired copolymer. The amounts can easily be determined by employing, for example, the equation given by FOX in 1 *Bull. An. Phy. Soc.* 123 (1956):

For example:
(1) a styrene/ethyl acrylate copolymer has a glass transition temperature varying between 0° C. and 20° C., if the styrene/ethyl acrylate ratio varies between 26/74 and 45/55; and
(2) a styrene/propyl acrylate copolymer has a glass transition temperature varying between 0° C. and 20° C., if the styrene/propyl acrylate ratio varies from 36/64 to 52/48

By comparison, the glass transition temperature of polystyrene is $+100°$ C., polyethyl acrylate is $-24°$ C., and polypropyl acrylate is $-37°$ C.

The above noted glass transition temperatures are measured by a method known as differential scanning calorimetry, as described by, for example, A. Lambert in 10 *Polymer* 319 (1969).

The aqueous dispersions of the copolymers of the nonionic ethylenic monomers and the alkyl acrylate monomers are obtained by aqueous emulsion polymerization of the monomers in a medium that is stable at an alkaline pH. Optionally, a stabilizing monomer is mixed into the copolymer.

The polymerization medium comprises, in addition to the monomers, an aqueous phase and various conventional emulsion polymerization additives, such as catalysts and emulsifiers. The emulsifiers are chosen to be stable in an alkaline medium.

Examples of catalysts include organic hydroperoxides, such as those of cumene, diisopropylbenzene, and paramenthane, and persulfates, such as those of sodium, potassium or ammonium.

The emulsifiers can include anionic agents, such as the salts of fatty acids and the alkali metal alkylsulfates, alkylsulfonates, arylsulfates, arylsulfonates, alkylarylsulfates, alkylarylsulfonates, sulfosuccinates and alkylphosphates; and nonionic agents, such as polyethoxylated fatty alcohols, polyethoxylated alkylphenols, and polyethoxylated fatty acids.

The aqueous dispersion of the copolymer of the nonionic ethylenic monomer and the alkyl acrylate monomer can contain from 20 to 60% and, preferably, from 40 to 55%, by weight of solids, having a particle diameter of between 0.05 and 0.5 microns.

In the present invention, the term "airy slaked lime having a low hydraulicity index" is understood to be a fat lime that is obtained by roasting calcareous rock, followed by slaking with water. Preferably, the airy slaked lime has a hydraulicity index of less than 0.015.

The hydraulicity index (i) of the lime is given by the ratio of the most acidic elements to the most basic elements:

$$i = \frac{SiO_2 + Al_2O_3 + Fe_2O_3}{CaO + MgO}$$

It has been found that an airy slaked lime, having a hydraulicity index of the order of 0.007, is very particularly effective in the dispersion of the invention.

According to the invention, the lime can be employed either in a pulverulent form or as a dispersion in water.

D-sorbitol can be used either in the pure state or in the form of an aqueous solution of any desired concentration.

The amounts of the various components of the lime dispersion paint, forming the subject of the invention, are such that the volume concentration of pigment (VCP) is of the order of 15–80% and preferably of the order of 40–70%. The VCP is defined as the ratio of the volume of the pulverulent materials (namely, pigment(s)+lime+, optionally, fillers) contained in the paint to the volume of the corresponding solids content (namely, the solids content of the binder+dry pulverulent materials+dry adjuvants).

According to the invention, the water-based lime dispersion paint can advantageously contain:

a weight of lime relative to the weight of the solids content of the binder of 10 to 850% and, preferably, from 40 to 320%;

a weight of D-sorbitol, relative to the weight of lime of 0.1 to 2% and, preferably, from 0.5 to 1.5%; and a solids content of 45 to 85% by weight (namely, the solids content of the binder+dry pulverulent materials+dry adjuvants) relative to the weight of the dispersion paint. The weight of the solids content is advantageously 45–65% for a fluid paint, and 65–95% for a rough-cast coating.

Among the pigments that can be present in the paint, titanium dioxide of the rutile or anatase type is especially effective.

The amount of the pigment depends on the type of paint desired. The amount of pigment can vary from 10 to 90% relative to the weight of pulverulent materials, depending on whether a matt paint or a gloss paint is being prepared.

Among the usual dispersants that are stable at a basic pH, an alkali metal polyacrylate, such as those of sodium, is preferred. The dispersants can be used in an amount of the order of 0.15–2% by weight of the solids relative to the total weight of the paint.

Among the usual thickeners that are stable at a basic pH, an aqueous solution of a nonionic water-soluble polyurethane is preferred. The thickener can be used in an amount of the order of 0.15% by weight of solids relative to the total weight of the paint.

The lime dispersion paint, forming the subject of the invention, can also optionally contain:

(1) coalescence agents, such as the monobutyl ether of ethylene glycol or of diethylene glycol; the phenyl ether of ethylene glycol, propylene glycol or dipropylene glycol; or products of the white spirit type having a low content of aromatic compounds to lower, where necessary, the minimum film-forming temperature of the binder, for example, down to a temperature below or equal to 0° C., in an amount ranging from 3 to 4 parts by weight per 100 parts of binder;

(2) anti-foam agents, for example of the dimethylpolysiloxane oil type, to avoid possible foam formation as a result of mechanical stirring;

(3) antifreeze agents such as alcohols, alkanediols (propane-1, 2-diol or diethylene glycol) and polyethylene glycols, in an amount that can be up to 10% by weight of the paint.

The present invention also relates to a process for the preparation of the water-based lime dispersion paint described above. The water-based lime dispersion paint can be obtained by mixing, with stirring, the various constituents in the amounts indicated above, as described below.

Preferably, the water-based lime dispersion paint can be produced by incorporating a pigment paste, containing a pigment dispersed in an aqueous or aqueous alcoholic medium, into a mixture containing airy slaked lime having a low hydraulicity index. The airy slaked lime in the mixture is dispersed in a medium containing water, D-sorbitol, and a binder. The water-based lime dispersion paint can also be prepared by incorporating various additives, the binder, and the lime into the pigment paste, which has been prepared beforehand, and then dispersing the reactants into the aqueous or aqueous alcoholic medium.

The dispersing of the pigment and the lime are assisted by the use of a dispersant, such as those described above.

The water-based lime dispersion paint, forming the subject of the invention, is stable on storage, without a significant variation in viscosity over time.

The water-based dispersion paint is easily applied to substrates, such as those based on an hydraulic binder, plaster, wood, and chipboard, by use of conventional processes, such as a roller, an air gun, or a brush.

After drying, the paint forms a film having good properties. In particular, the paint exhibits good dry adhesion and good wet abrasion resistance.

It has, moreover, been found that the paint, forming the subject of the invention, has a pH of at least 12 and is film-forming, which is a result of coalescence occurring from the loss of water. The paint is insensitive to excess basicity and to excess water. Because of these properties, the paint can be applied to a substrate that is based on an hydraulic binder a short time after the removal of the formwork from the substrate. Typically, the paint can be applied to the substrate within 2 or 3 days after the removal of the formwork. This is a particularly important advantage, since it is generally accepted that substrates based on hydraulic binders should only be coated or painted when their moisture content is less than 5% and their pH is less than 12. Prior to the present invention, a month must lapse after the removal of the formwork from the substrate, before a paint is applied to the substrate.

The examples that follow are intended to be merely exemplary. They are not to be considered as restrictive of the scope and spirit of the invention.

EXAMPLE 1

Mixing and dispersing the lime

The following were mixed in a 20 liter paint disperser:
(a) 255 parts by weight of an aqueous dispersion of a styrene/butyl acrylate copolymer having the following characteristics:
weight ratio of styrene/butyl acrylate: about 50/50
solids content: about 50%
emulsifiers: sodium alkylsulfonate and oxyethyleneated alkylphenol
catalyst: ammonium persulfate
particle diameter: between 0.05 and 0.40 μm
minimum film-forming temperature: 16° C.
viscosity, measured at 20° C. on a Brookfield viscometer at 50 rpm: 50 mPa.s
(b) 37 parts of propane-1,2-diol;
(c) 150 parts of water;
(d) 5 parts of a 70% strength by weight aqueous solution of D-sorbitol;
(e) 5.5 parts of COATEX BR/3, an aqueous solution of an acrylic copolymer salt, marketed by COATEX as a dispersant;
(f) 6 parts of NAPSOL PPH2, a phenyl ether of dipropylene glycol, marketed by B.P. Chimie, as a coalescence agent;
(g) 4 parts of a white spirit; and
(h) 315 parts of airy slaked lime, having the following characteristics:
hydraulicity index: 0.0072
viscosity at 20° C. and 750 g/liter: 0.5 poise
mean particle size: 7 μm
sieve retention: 4.28%

Pigment paste

A pigment paste, having the following constituents, was prepared in a conventional manner by admixing:
(a) 13 parts of propane-1,2-diol;
(b) 6.5 parts of water;
(c) 1.5 parts of COATEX BR/3 dispersant;
(d) 2 parts of NOPCO 8034 anti-foam agent, marketed by DIAMOND SHAMROCK; and
(e) 60 parts of titanium dioxide RL 68, marketed by THANN et MULHOUSE.

The pigment paste was then incorporated into the lime dispersion.

The paint obtained had the following characteristics:
solids content: about 60%
P/B (pigment/binder ratio, as dry weight): 2.94/1
VCP (volume concentration of pigment): about 55%
Brookfield RVT viscosity (2.5 rpm):
initial: 8,400 mPa.s
after 500 h at 20° C.: 8,000 mPa.s
after 500 h at 40° C.: 10,000 mPa.s
Brookfield RVT viscosity (50 rpm)
initial: 2,200 mPa.s
after 500 h at 20° C.: 2,100 mPa.s
after 500 h at 40° C.: 3,500 mPa.s Dry pull-off strength This test was carried out by means of a 2 cm wide adhesive tape, having adhesion in accordance with standard specification NFT 30.038. The adhesive tape was applied uniformly over the same width of the surface film, which has beforehand been incised down to the substrates. The adhesive tape was then pulled off in a rapid and continuous movement.
3 substrates: wood, asbestos cement, and glass;
thickness of the paint films: 15 and 30 microns
results: no pulling-off from any of the three substrates, regardless of whether the paint film was 15 microns or 30 microns thick.

Wet abrasion resistance

The test was carried out by means of an abrasimeter having a load of 1,000 g.
substrate: asbestos cement
results: good, for a 15 micron and a 30 micron film.

The result was considered to be "good" when the degree of wear was less than 50%, after about 10,000 and 20,000 passes.

Folding test

An evaluation of the "flexibility" of the films, in accordance with the principle of standard specification NFT 30.040, was performed.
substrate: polyethylene
mandrel diameter: 1 cm
duration of movement: 10 seconds
results: no crazing in a 15 micron film and no crazing in a 30 micron film.

EXAMPLE 2

A paint was prepared, as in Example 1, by mixing a lime dispersion and a pigment paste.
(1) The lime dispersion was obtained by mixing:
(a) 100 parts of the styrene/butyl acrylate binder used in Example 1;
(b) 2 parts of NAPSOL PPH1, a phenyl ether of monopropylene glycol, marketed by BP Chimie;
(c) 1.5 parts of a white spirit;
(d) 100 parts of water;
(e) 1.5 parts of a 70% strength aqueous solution of D-sorbitol;
(f) 1.7 parts of COATEX BR/3; and
(g) 135 parts of the lime used in Example 1.
(2) A pigment paste was obtained by mixing:
(a) 6 parts of propane-1, 2-diol;
(b) 3 parts of water;
(c) 0.9 parts of NOPCO 8034 anti-foam agent;
(d) 0.7 parts of COATEX BR/3; and
(e) 27 parts of titanium oxide RL 68.

The paint obtained had the following characteristics:
solids content: about 57%
P/B: 3.24/1
VCP: about 57%
Brookfield viscosity at 20° C., in mPa.s
at 2.5 rpm: 9,000
at 50 rpm: 900

EXAMPLE 3

A paint was prepared, as in Example 1, by mixing a lime dispersion and a pigment paste.
(1) The lime dispersion was obtained by mixing:
(a) 100 parts of the styrene/butyl acrylate binder used in Example 1;
(b) 70 parts of water;
(c) 2 parts of butyl diglycol; ,
(d) 1.5 parts of a white spirit;
(e) 1 part of a 70% strength aqueous solution of D-sorbitol;
(f) 1.5 parts of COATEX BR/3; and
(g) 100 parts of the lime used in Example 1.
(2) A pigment paste was obtained by mixing:

(a) 5.8 parts of propane-1,2-diol;
(b) 3.2 parts of water;
(c) 0.9 parts of NOPCO 8034 anti-foam agent;
(d) 0.7 parts of COATEX BR/3; and
(e) 27 parts of titanium oxide RL 68.

The paint obtained had the following characteristics:
solids content: about 57%
P/B: 2.54/1
VCP: about 50.5%
Brookfield viscosity at 20° C., in mPa.s
  at 2.5 rpm: 8,000
  at 50 rpm: 800

EXAMPLE 4

The following were mixed in a paint disperser:
(a) 230 parts of water;
(b) 50 parts of propane-1,2-diol;
(c) 5 parts of a 70% strength aqueous solution of D-sorbitol;
(d) 8 parts of COATEX BR/3;
(e) 60 parts of the styrene/butyl acrylate binder used in Example 1;
(f) 5 parts of the lime used in Example 1;
(g) 2 parts of NOPCO 8034;
(h) 60 parts of titanium oxide RL 68; and
(i) 345 parts of the lime used in Example 1.

The mixture was then stirred for 20 minutes.
The formulation obtained was then adjusted by adding:
(a) 165 parts of the styrene/butyl acrylate binder used in Example 1;
(b) 6 parts of NAPSOL PPH2;
(c) 3 parts of a white spirit; and
(d) 3 parts of a thickener COATEX BR/100, containing 10% of a nonionic water-soluble polyurethane, marketed by COATEX.

The paint obtained had the following characteristics:
solids content: about 57%
P/B: 3.65/1
Brookfield viscosity at 20° C., in mPa.s
  at 2.5 rpm: 10,000
  at 50 rpm: 1,880

EXAMPLE 5

A preparation of a coating, which could be applied in a thickness of 1 to 2 mm, was performed.

A pigment paste of the following composition was prepared in a conventional manner:
(a) 3.1 parts of propane-1,2-diol;
(b) 1.55 parts of water;
(c) 0.35 part of COATEX BR/3;
(d) 0.47 parts of Nopco 8034 anti-foam agent; and
(e) 14.28 parts of titanium oxide RL 68.

The following was then incorporated, with stirring, into the pigment paste:
(a) 13.1 parts of water;
(b) 8.33 parts of propane-1,2-diol;
(c) 0.71 part of a 70% strength aqueous solution of D-sorbitol;
(d) 1.30 parts of Coatex BR/3;
(e) 100 parts of the 50% solids content styrene/butyl acrylate dispersion used in Example 1;
(f) 4.76 parts of Napsol PPH2;
(g) 35.70 parts of the lime used in Example 1;
(h) 23.80 parts of crystalline calcium carbonate of mean diameter 40 microns, with a maximum of 100 microns; and
(i) 142.85 parts of crystalline calcium carbonate of 100 to 700 microns.

Characteristics of this coating:
solids content: 88%
P/B ratio: 4.33/1

It will be apparent to those skilled in the art that various other modifications and variations could be made in the composition and process of the invention without parting from the scope and content of the invention.

What is claimed is:

1. A water-based lime dispersion paint comprising:
    (a) a binder comprising a film-forming copolymer of an alkyl acrylate monomer having an alkyl group containing from 1 to 8 carbon atoms, and a nonionic ethylenic monomer, the copolymer being dispersed in an aqueous medium, the dispersion being stable at a basic pH, and the copolymer having a glass transition temperature in the range of $-5°$ C. to $25°$ C.;
    (b) a pulverulent material comprising one or more pigments and airy slaked lime having a hydraulicity index of less than 0.015; and
    (c) adjuvants being stable at a basic pH and including at least D-sorbitol,
    wherein the binder, the pulverulent material, and the adjuvants are present in an amount effective to form a water-based lime dispersion paint.

2. A water-based lime dispersion paint of claim 1, wherein the alkyl acrylate monomer is capable of forming a homopolymer having a glass transition temperature in the range of $+10°$ C. to $-60°$ C.

3. A water-based lime dispersion paint of claim 1, wherein the alkyl acrylate monomer has an alkyl group containing from 1 to 4 carbon atoms.

4. A water-based lime dispersion plant of claim 1, wherein the nonionic ethylenic monomer is selected from the group consisting of a vinylaromatic monomer, an alkyl methacrylate monomer, and an acrylonitrile monomer.

5. A water-based lime dispersion paint of claim 1, wherein the nonionic ethylenic monomer is styrene.

6. A water-based lime dispersion paint of claim 1, wherein the binder contains from 20 to 60% by weight of solids having a particle diameter of between 0.05 and 0.5 micron.

7. A water-based lime dispersion paint of claim 1, wherein the airy slaked lime has a hydraulicity index of 0.007.

8. A water-based lime dispersion paint of claim 1, wherein the volume concentration of pigment is within the range of 15 to 80%.

9. A water-based lime dispersion paint of claim 1, wherein the volume concentration of pigment is within the range of 40 to 70%.

10. A water-based lime dispersion paint of claim 1, wherein the binder has a solids content of 45 to 85% by weight, the weight of lime relative to the weight of the solids content of the binder is 10 to 850%, and the weight of D-sorbitol relative to the weight of lime is 0.1 to 2%.

11. A water-based lime dispersion paint of claim 1, wherein the binder has a solid content of 45 to 85% by weight, the weight of lime relative to the weight of the solids content of the binder is 40 to 320%, and the weight of D-sorbitol relative to the weight of the lime is 0.5 to 1.5%.

12. A water-based dispersion paint of claim 1, wherein the adjuvant is selected from the group consisting of dispersants, thickeners, stabilizers, anti-foam agents, antifreeze agents, coalescence agents, fungicides, and combinations thereof.

13. A water-based lime dispersion paint of claim 1, wherein the nonionic ethylenic monomer is capable of forming a homopolymer having a glass transition temperature in the range of 70° C. to 170° C.

* * * * *